Oct. 18, 1966   A. J. COOK ETAL   3,279,082
RADIAL AND AXIAL CLEARANCE GAGE FOR BALL BEARINGS
Filed Oct. 2, 1964   6 Sheets-Sheet 1

INVENTORS
ARTHUR J. COOK
JACK E. DEAN
OTIS A. MONROE

INVENTORS
ARTHUR J. COOK
JACK E. DEAN
OTIS A. MONROE

United States Patent Office 3,279,082
Patented Oct. 18, 1966

3,279,082
RADIAL AND AXIAL CLEARANCE GAGE FOR BALL BEARINGS
Arthur J. Cook, Jack E. Dean, and Otis A. Monroe, Grand Rapids, Mich., assignors to Lear Siegler, Inc.
Filed Oct. 2, 1964, Ser. No. 400,985
3 Claims. (Cl. 33—174)

This invention relates to a gage device for testing the radial and axial clearance of a bearing assembly, and more particularly to a highly sensitive gage particularly suited to measure internal clearance of high precision bearing assemblies, especially for instruments, to determine whether tolerance requirements are met.

The radial clearance of a bearing is that physical displacement encountered when one race for the bearing is held fixed and the other race is shifted normal to the bearing axis, from its maximum displacement in one direction to its maximum displacement in the opposite direction. Axial clearance of a bearing is that physical displacement encountered when one race of the bearing is held fixed and the other race is shifted along the bearing axis between the maximum displacement positions. These characteristics, while important in almost all bearing assemblies, are crucial in high precision bearings employed for example, in inertial instruments such as accelerometers and gyroscopes. Consequently, simple bearing testing machinery presently available, and satisfactory for normal bearings, is not at all capable of the accurate clearance indications necessary for determining suitability of high precision bearings.

It is therefore an object of this invention to provide a unique bearing testing gage having extremely accurate displacement sensing and measuring. It furthermore is capable of indicating both radial and axial clearance of high precision bearings. Moreover the device is relatively simple to operate, being adaptable for production line usage.

It is another object of this invention to provide a testing gage for high precision bearings, that accomplishes a controlled testing sequence automatically, with complete dependability, to accurately detect and indicate minute amounts of bearing clearance, using a special sequence controlling apparatus.

These and several other objects of this invention will become apparent upon studying the following specification in conjunction with the drawings in which.

Figure 1:
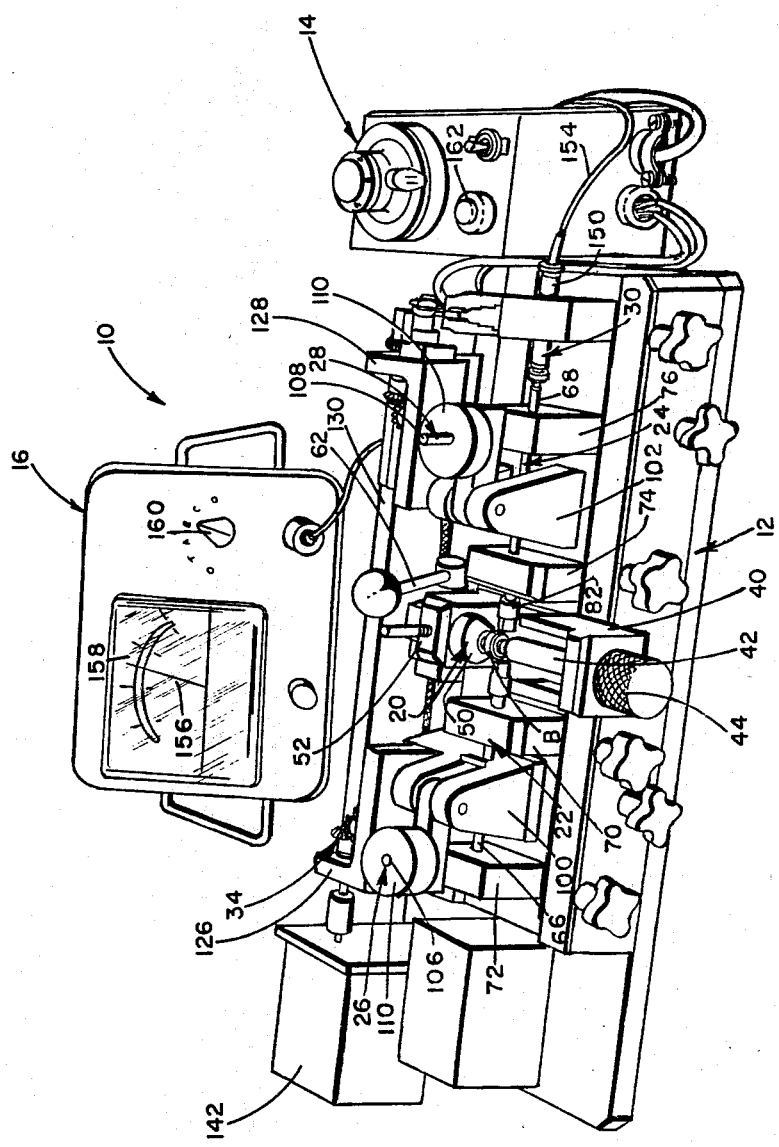
FIG. 1 is a perspective view of the front of the novel device.

Referring now specifically to the drawings, the complete testing apparatus 10 includes the basic bearing support and biasing assembly 12, the electrical control assembly 14, and the indicator assembly 16.

The basic supporting and testing assembly 12 includes bearing fixture means 20, bearing contacting plunger and probe assemblies 22 and 24, respective biasing assemblies 26 and 28 for the plunger assemblies, displacement sensor means 30, and sequence controlling drive assembly 34.

Figure 3:
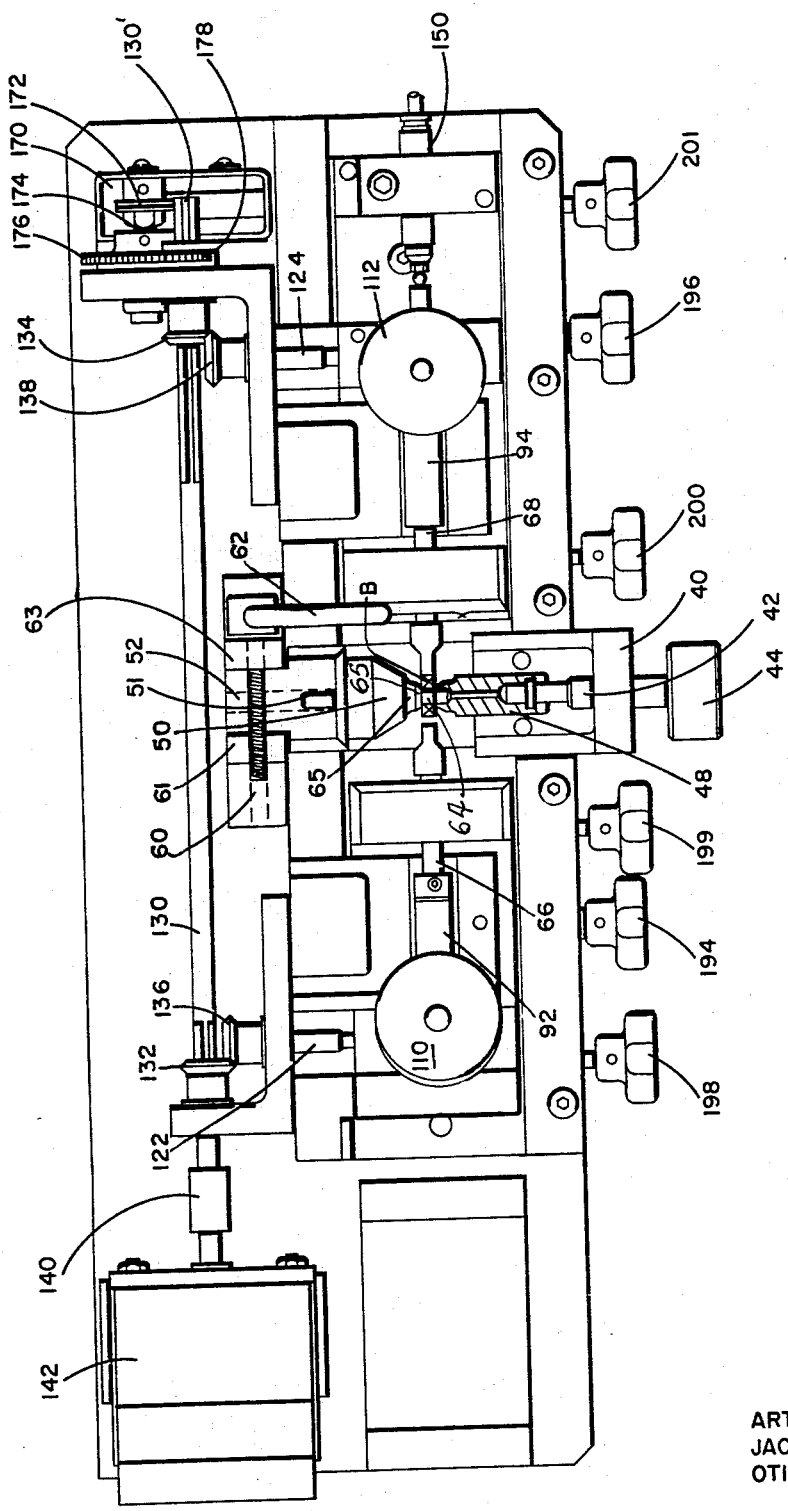
FIG. 3 is a plan view of the apparatus.

Specifically, the bearing fixture means 20 includes a first rigid fixture support 40 having an axially adjustable fixture shaft 42 threadably engaged therewith. The shaft has an adjusting knob 44. The inner end of this rod includes a rotatable collar 48 (FIG. 3) having a hollow tapered nose. The decreased diameter nose cooperates with a corresponding but opposite nose on the cooperative hub support 50 to grip the opposite sides of the inner race of a bearing B to be tested. Support 50 includes a block 52 having a rearwardly extending central flange around pin 60. This pin extends through straddling pillow blocks 61 and 63 and is threadably engaged with block 61 to allow it to be tightened and bind the assembly. This block 52 is normally fixed in its horizontal position illustrated, but may be rotated on the horizontal pivot axis of pin 60 to enable support 50 to be pivoted diagonally upwardly at an angle. Support hub 50 is removable from the block due to the sliding interfit of its stub pin 51 in a socket in block 52 (FIG. 3). Thus the tilting allows ease of insertion of adaptor supports 50 to suit various size bearings and ease of mounting bearing B on receiving pin 64. The normal fixed horizontal orientation of this element is maintained by tightening fixture lock bar 62.

Consequently, a bearing B to be tested, when inserted over the appropriate receiving pin 64 of support 50, has its inner race secured in position by tightening shaft 42 to force the nose of collar 48 over pin 64 and against the bearing inner race and squeeze it tightly. The outer race is then exposed for testing as shown in FIG. 1.

Figure 2:
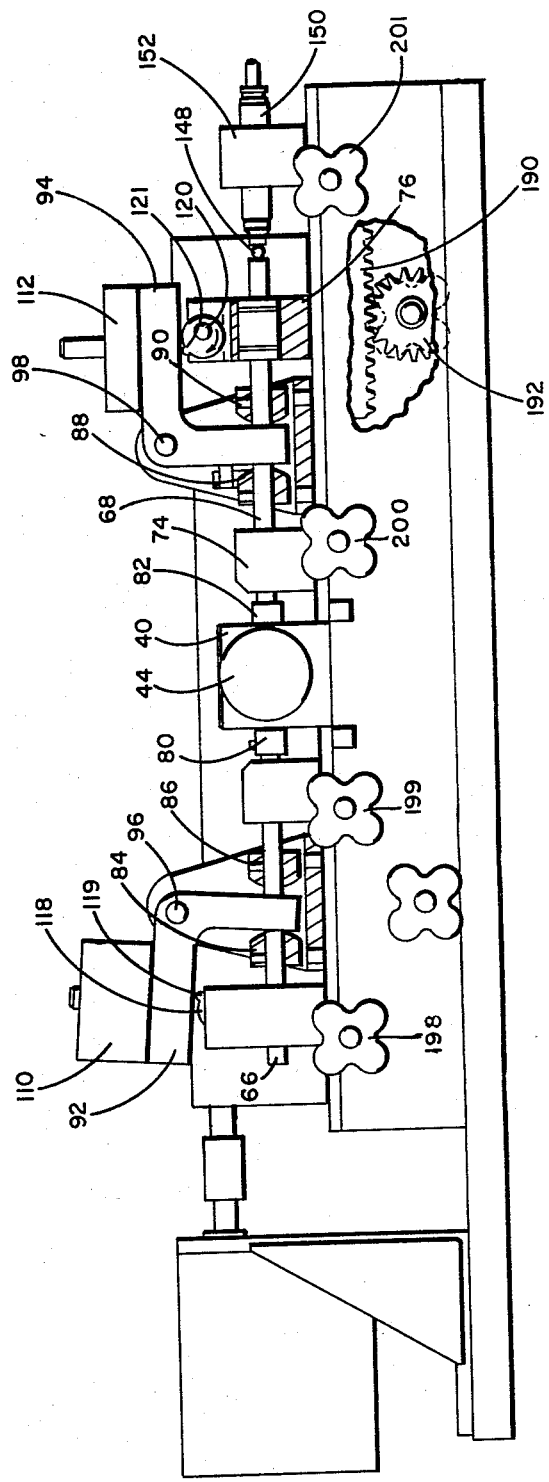
FIG. 2 is a front elevational view of the apparatus.

On opposite sides of bearing B, co-axial with each other, and on a horizontal axis normal to the horizontal axis of the bearing and its supports, are two biasing and displacement sensing assemblies 26 and 28. More specifically, these assemblies include a pair of plungers 66 and 68 respectively. Plunger 66 is slidably supported in guide blocks 70 and 72. Plunger 68 is slidably supported in guide blocks 74 and 76. Each of these plungers includes a contacting probe, specifically probes 80 and 82 for plungers 66 and 68 respectively. Also, as shown in FIG. 2, each plunger includes a pair of spaced stops attached thereto, specifically, stops 84 and 86 on plungers 66, and stops 88 and 90 on plunger 68. These stops, positioned between the two mounting blocks of the respective plungers, are fixed to the plungers by set screws. Each pin receives between them the lower end of one leg of a pair of L-shaped levers 92 and 94 respectively, each mounted at the bight on the respective pivot axis pins 96 and 98. The pivot pins are supported by the respective pairs of brackets 100 and 102 to allow the levers to pivot toward and away from each other and the fixture, in a common plane. The L-shaped levers have upper legs projecting away from the bearing fixture assembly and these include vertical pins 106 and 108 extending upwardly therefrom to receive counterweights 110 and 112. Each of these assemblies normally applies a biasing force through the respective stops, plungers and probes toward the bearing and opposite plunger assembly. Application of these biasing forces is specifically controlled in amount according to the counterweights applied, and controlled in time of application to a predetermined sequence. The biasing means are each physically controlled on their pivotal mounts by rotational lifting cams 118 and 120, operably engaging the under surface of the upper leg of L-shaped brackets 92 and 94 (FIG. 2). These cams are supported on a pair of shafts 122 and 124 (FIG. 3) attached to angle brackets 126 and 128.

These angle brackets also form a rotatable shaft mount for the elongated drive shaft 130. Mounted on this drive shaft is a pair of bevel gears 132 and 134 which engage respectively with corresponding intermeshing bevel gears 136 and 138 on shafts 122 and 124 respectively. Rotation of shaft 130 is through coupling 140 powered by motor 142.

Each of the two control cams 118 and 120 includes a radially extended lobe to lift the respective bracket substantially for releasing the biasing force thereon and also withdrawing the probe out of contact with the bearing. Actually, the levers contact outermost stops 84 and 90 to retract probes 80 and 82 away from the bearing. Cam 120 includes a smaller radial enlargement to shift its L-shaped bracket sufficiently to retract the biasing force against the bearing, but not retract the probe away from the bearing. This is achieved due to stops 88 and 90 being spaced a distance greater than the thickness of lower leg of bracket 94, to have a small, limited, predetermined amount of play between the stops and bracket. The purpose of this will be described hereinafter.

Engaging the extended outer axial end face of plunger 68 is the tip 148 of a displacement sensor 150 anchored to mount 152. This displacement sensor is a transducer responsive to millionths of an inch displacement, to create a corresponding electrical output signal transmitted through lead 154 to electrically responsive indicator means 16. This causes hand 156 to show the amount of displacement on gage face 158. Sensitivity of the gage can be adjusted with selector knob 160.

The control assembly 14 includes a starting switch 162 to actuate drive motor 142. The motor automatically makes three revolutions, at which time it is stopped by micro-switch 170 (FIG. 3). This micro-switch is actuated by a cam 172 mounted on a shaft 174, to which a large spur gear 176 is attached. This spur gear is driven by a smaller meshing spur gear 178, having a circumference one third of that of gear 176. It is attached to the extended end 130' of drive shaft 130. The purpose for the three revolutions will be explained hereinafter.

Initial adjustment of probes 80 and 82 to suit the particular bearing size to be tested is achieved by mounting the plunger support blocks and the sensor on an elongated carriage having a gear rack 190 thereunder (FIG. 2). Each biasing, end probing assembly is mounted on a separate gear rack on opposite ends of the device. Each gear rack is interengaged with a control spur gear 192, one of which is shown, and the other of which is identical thereto. The spur gears are rotated on their shafts by the extended knobs 194 and 196. The two gear racks are locked in a particular adjusted position by two pairs of locking screws, using their respective knobs 198, 199, 200 and 201.

To use the novel gage device for testing the radial play of a bearing, an adaptor support 50 is selected to have an extension pin 64 of a diameter equal to that of the bearing inner race, and a shoulder 65 calculated to position the bearing ball raceways on the centerline of the gaging plungers 66 and 68. This adaptor is slidably inserted in support block 52. To tilt the block for easy insertion of the adaptor, crank 62 is turned to loosen the mechanism. The assembly is then tilted back sufficiently to insert the adaptor. After inserting the adaptor, bearing B is placed on pin 64, the assembly is rotated back on its horizontal axis and retightened. Knob 44 is rotated to turn screw shaft 42 in, causing the inner end of collar 48 to abut the inner race of bearing B and forcibly tighten it against the nose of element 50 to secure it. Suitable gaging probes 80 and 82 are selected for proper bearing width and slid on the ends of plungers 66 and 68 and are locked in place by set screws.

Next, to determine the outer race clearance with respect to bearing balls and the inner race, probes 80 and 82 are adjusted with respect to their placement against the bearing by loosening knobs 198, 199, 200 and 201. Then, by rotating knobs 194 and 196, spur gears 192 shift gear racks 190 to adjust each of the plungers, probes, and their support assemblies. When appropriate adjustment has been made, so that the probes are ready to detect movement and apply a biasing force to the bearing, the locks are tightened.

Suitable counterweights 110 and 112 are next placed on pins 106 and 108 of the bracket units to apply biasing forces against the plunger. Normally, sensor 30 includes an internal spring assembly which applies an initial biasing force, usually about 2 ounces. Also, each of brackets 92 and 94 has an initial biasing force due to its weight, usually around 2 ounces. Accordingly, counterweight 110 on pin 106 for the biasing means opposite sensor 30 must be greater in weight than counterweight 112 on the opposite pin for the opposite plunger and probe assembly.

Motor 142 is then started by depressing actuating switch 162. The motor rotates drive shaft 130 which, due to the bevel gear interengagement, rotates cam shafts 122 and 124 to revolve individual cams 118 and 120. The cams are circumferentially oriented on their respective cam shafts, so that simultaneous rotation thereof causes the following sequence to occur.

Firstly, the probing means having sensor 30 in contact therewith has a biasing force applied from its counterweight to apply a bias to the right side of bearing B. This is done by allowing the counterweight to press against stop 88 by rotating cam 120 to release the counterweight means.

The outer race of the bearing is thus displaced to its extreme left position as the structure is viewed in the drawings. Then, this right hand probe is retracted sufficiently by rotation of cam 120 against bracket 94 to lift the lever enough to release the biasing force by hoisting the counterweight. Yet, the lever is not retracted sufficiently to abut the second stop 90 and retract the plunger and probe from contact with the bearings. The plunger 68 then still serves as part of the sensor, but not as part of the biasing means. At the same time, the left probe exerts its biasing force by lowering of bracket 92, enabling counterweight 110 to press against stop 86 and force the outer bearing race to the opposite extreme. As it is forced from its left hand extreme to its right hand extreme, probe 82 is shifted backwardly so that plunger 68 shifts the movable element 148 in sensor 150, causing an electrical signal through lead 154 to be indicated by needle 156 on instrument 158.

After a momentary indication, extended lobes 119 and 121 of cams 118 and 120 lift both brackets 92 and 94 simultaneously, to retract both probes 80 and 82 out of contact with the bearings.

This enables the bearing to be manually turned approximately 120 degrees, prior to exertion of the right hand biasing force to probe 82 again.

The same probe shifting and bias applying sequence as that just described is then repeated. This is followed by a second release to enable the bearing to be rotated again about 120 degrees by the operator's finger. The three tests on the periphery of the bearing is in accordance with optimum testing procedure. After the three successive like sequences, cam 172 (FIG. 3) has made one rotation to shift micro-switch 170, thereby deactuating motor 142. When this has occurred, individual cams 118 and 120 have made three revolutions.

By so testing, experience has shown even minute clearance is readily detectable, accurately, repeatedly, yet simply so that the accurate device can even be employed for production line testing of high precision instrument bearings.

Different size bearings can be readily tested by merely replacing adaptor support 50, collar 48, and probes 80 and 82, as previously described, and adjusting the probe positions with the gear and rack assemblies.

Figure 4:
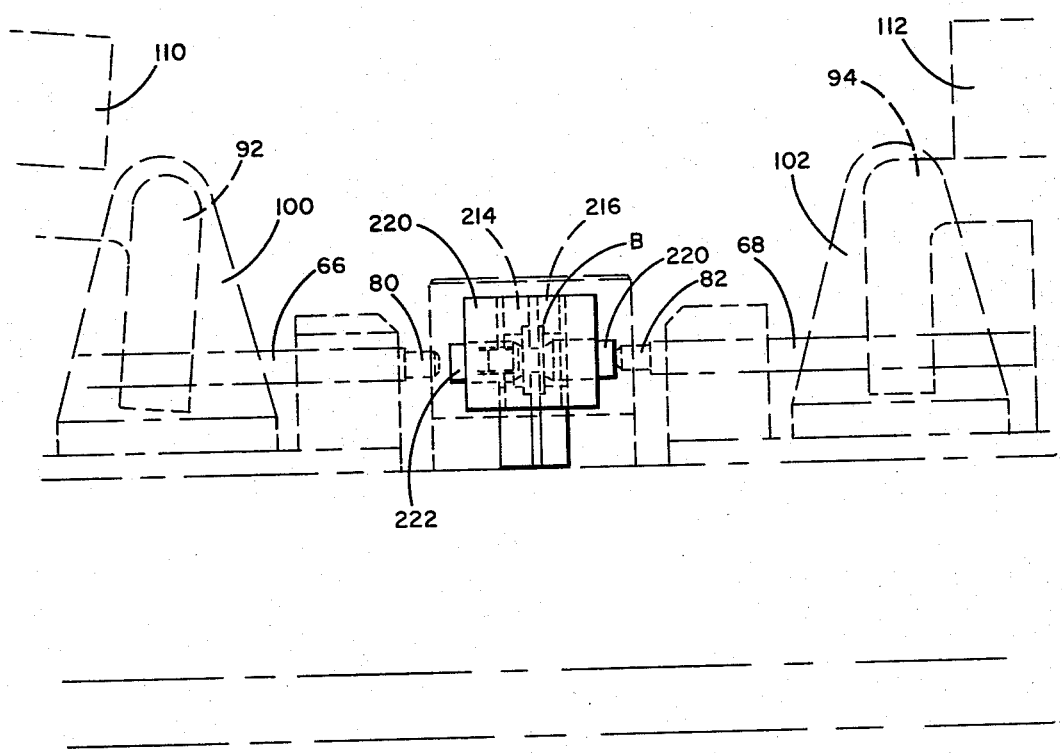
FIG. 4 is a fragmentary elevational view of the central portion of the apparatus in FIGS. 1, 2 and 3, with adaptor support plates for retaining a bearing for axially testing.
Figure 5:
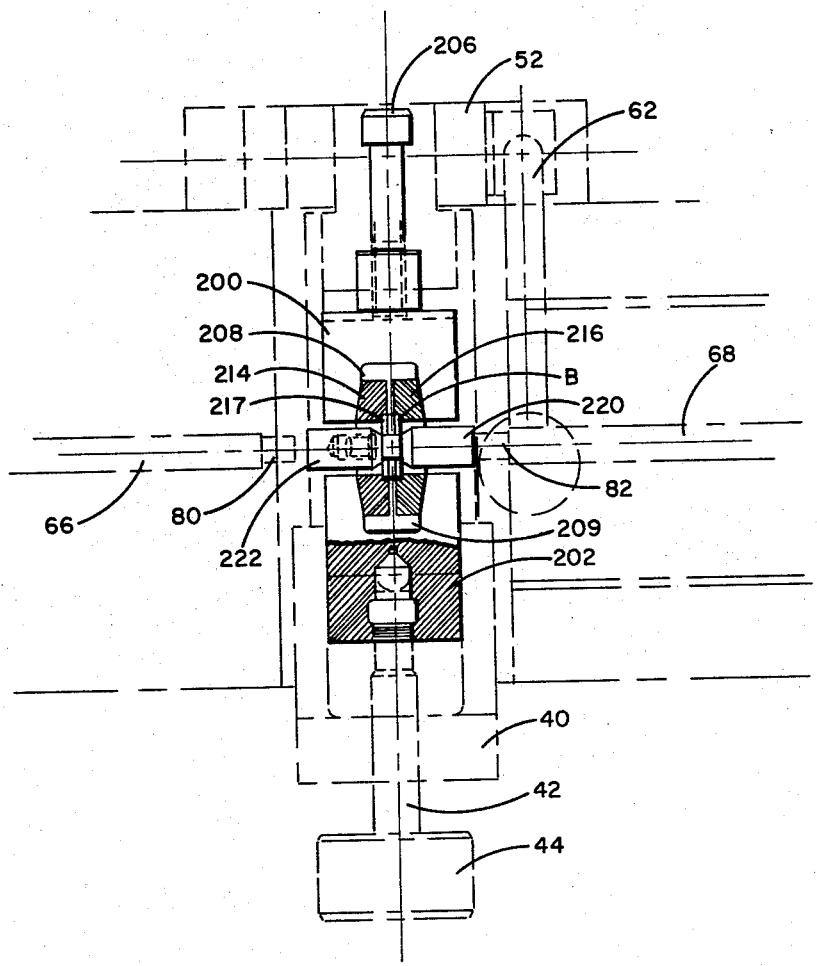
FIG. 5 is a fragmentary, plan, partially sectioned view of the apparatus in FIG. 4.
Figure 6:
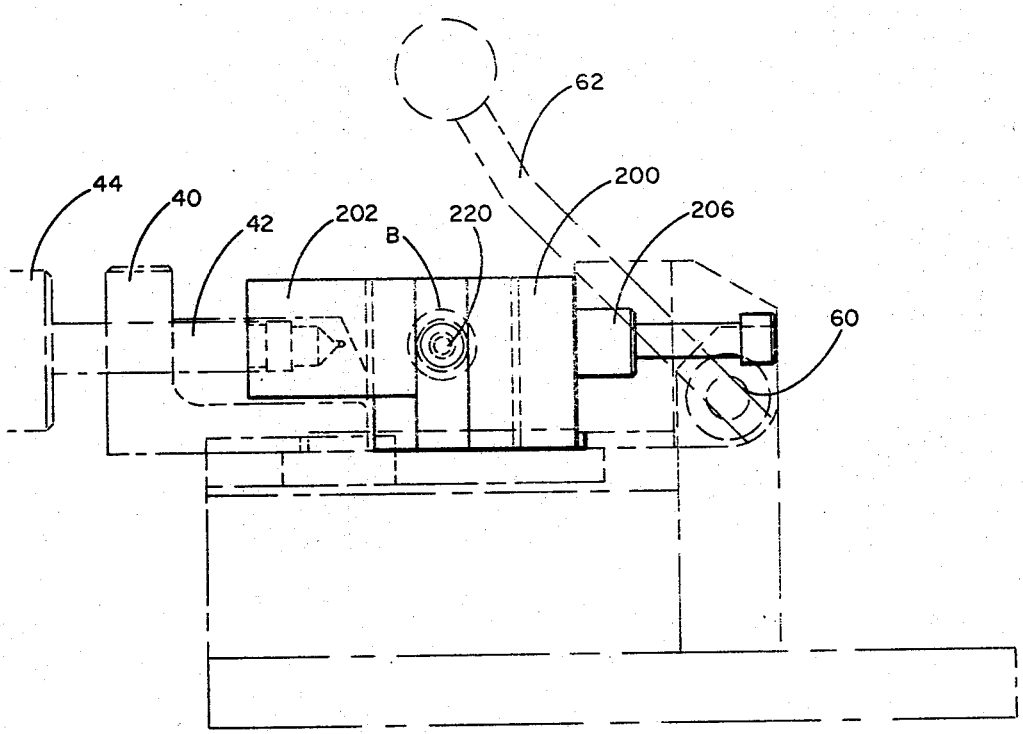
FIG. 6 is a fragmentary end view of the apparatus in FIGS. 4 and 5.

Also, axial bearing play can be measured using this same structure, with a pair of added adaptor blocks and a pair of retention rings. Referring to FIGS. 4, 5 and 6, by removing inner race adaptor 50 from support 52, inserting a pair of support fixture adaptor blocks 200 and 202, and a pair of bearing retention rings 214 and 216, bearing B can be mounted with its axis co-axial with the probes instead of normal thereto as previously. Adaptor block 200 is secured to mounting block 52 by a set screw 206 extending through the backside thereof. This block includes a generally U-shaped groove 208 in its outer face, having divergent side faces and facing the like U-shaped divergent groove 209 in block 202. Block 202 is adjustably attached to threaded shaft 42 for adjustment with knob 44 through the rigid support 40. Bearing B is actually positioned between a pair of angular, outer race clamping rings 214 and 216, having tapered axial end surfaces to be securely received in the grooved blocks 200 and 202. Together the rings form an annular, inner, bearing receiving groove 217. This locks the outer race securely in the fixture, enabling the inner race to be axially shifted for testing with the probing structure. Probes 80 and 82 on plungers 66 and 68 do not abut the bearing itself, but rather, for convenience, abut the extended axial end faces of a pair of threadable interengaged tapered-nose pins 220 and 222 extending through the inner race and tightened thereon. The same sequential camming action described with respect to radial displacement testing is then repeated to first apply maximum bias in one direction through plunger 68 for maximum displacement in that direction, then retracting that bias from plunger 68, but allowing it to retain its sensing contact with pin 220, applying the maximum bias in the opposite direction (to the right) for forcing the inner race to its maximum displacement in that direction. The sensing apparatus senses and indicates this movement.

Bearings of different size can be substituted and tested merely by replacement of gripping rings 214 and 216 with those of different internal diameter grooves 217 to receive the different diameter bearing assemblies.

Thus, it will be readily observed that testing is always achieved on a horizontal axis, for optimum testing conditions, and that both radial and axial clearance can be measured, even of different size bearings. Yet all can be achieved in a simple manner with relatively little skill, using the novel device.

Those skilled in this art will readily realize, upon studying the foregoing preferred form of the inventive structure, that certain details of construction could conceivably be modified within the concept presented, to suit particular circumstances, configuration of bearings, and assembly arrangements. Accordingly, it is the intention of the inventors herein to be limited only by the scope of the appended claims and the reasonably equivalent structures to those defined therein.

We claim:

1. A bearing tester comprising: bearing supporting fixture means; a pair of oppositely oriented plunger elements, each slidably supported on its axis, and both oriented toward said fixture means; a pair of bearing contact probes on said plungers, opposite each other; a pair of spaced stops on each of said plungers; a weighted, shiftable biasing means between each of said pair of stops; each of said biasing means positioned to normally apply a biasing force on the respective plunger and probe toward said fixture means; pressure sensitive displacement sensor means operably attached to one of said plungers; camming means operably associated with each of said biasing means to respectively release said biasing force therefrom; controlled cam actuating means operably associated with said camming means to alternately shift said camming means and thereby said biasing means; said biasing means being releasable from said one plunger to allow release of said biasing means without shifting of said plunger to allow the opposite plunger and biasing means to exert force on a bearing, and its displacement to be detected by said sensor means.

2. A bearing tester comprising: bearing supporting fixture means; a pair of oppositely oriented plunger elements, each slidably supported on its axis, and both oriented toward said fixture means; a pair of bearing contact probes on said plungers, opposite each other; a pair of spcaed stops on each of said plungers; a weighted, shiftbale biasing means with portions between each of said pair of stops; each of said biasing means positioned to normally apply a biasing force on the respective plunger and probe toward said fixture means; pressure sensitive displacement sensor means operably attached to one of said plungers; camming means operably associated with each of said biasing means to respectively release said biasing force therefrom; controlled cam actuating means operably associated with said camming means to alternately shift said camming means and thereby said biasing means; said biasing means being releasable from said one plunger to allow release of said biasing means without shifting of said plunger to allow the opposite plunger and biasing means to exert force on a bearing, and its displacement to be detected by said sensor means; and said cam actuating means being programmed and having varying camming surfaces to allow a biasing force on said one plunger and probe against a bearing in said fixture means while camming the opposite biasing means and plunger to a retracted position, then to allow a biasing force on the other opposite plunger and probe against the bearing with release of the biasing means on said one plunger, and then release of both biasing means and retraction of both plungers to free the bearing.

3. A bearing tester comprising: bearing fixture means; displacement responsive probing means including a pair of oppositely positioned probes normal to said fixture means; each of said probes being axially shiftable toward and away from said fixture means and each other; a pair of biasing means operably associated with the respective probes, biasing them toward each other; a pair of independently pre-set, operatively inter-related camming control means in respective operative association with said pair of biasing means, to counteract the respective biasing means; power drive means operably associated with both said camming control means; displacement sensing and indicator means operably associated with said probing means; said camming control means being functionally correlated with respect to each other and said power drive means to cause sequential shifting thereof by said biasing means to accurately, automatically indicate total bearing and probe displacement; said fixture means including a pair of horizontally oriented, co-axial, cooperative, supports; and a pair of adapter blocks removably interfitted with said supports, including outer race gripping means, to retain a bearing in place, normal to said plungers, to allow probing contact with the inner race for determination of axial play.

References Cited by the Examiner

UNITED STATES PATENTS

| | | | |
|---|---|---|---|
| 1,062,566 | 5/1913 | Gohlke. | |
| 2,833,047 | 5/1958 | Aller | 33—174 |
| 2,932,900 | 4/1960 | Hanlon | 33—174 |
| 2,942,350 | 6/1960 | Sloan | 33—174 |
| 3,146,528 | 9/1964 | Goulet | 33—174 |

LEONARD FORMAN, *Primary Examiner.*